(12) United States Patent
Moore et al.

(10) Patent No.: US 7,581,923 B2
(45) Date of Patent: Sep. 1, 2009

(54) GAS TURBINE ENGINE WITH PURGE AIR PUMP AND GUIDE

(75) Inventors: Christopher W. Moore, Newington, CT (US); Roger E. Paolillo, Vernon, CT (US); James P. Chrisikos, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 346 days.

(21) Appl. No.: 11/159,686

(22) Filed: Jun. 23, 2005

(65) Prior Publication Data

US 2007/0025854 A1    Feb. 1, 2007

(51) Int. Cl.
*F01D 11/02*   (2006.01)
(52) U.S. Cl. .................. 415/173.7; 415/174.5; 60/752
(58) Field of Classification Search .............. 415/110, 415/111, 115, 116, 117, 173.7, 174.5; 416/95, 416/96 R, 96 A, 97 R; 60/752
See application file for complete search history.

(56) References Cited

U.S. PATENT DOCUMENTS

| 5,252,026 | A | * | 10/1993 | Shepherd | 415/115 |
| 5,372,476 | A | * | 12/1994 | Hemmelgam et al. | 415/135 |
| 5,545,004 | A | * | 8/1996 | Ho et al. | 415/115 |
| 5,800,124 | A | * | 9/1998 | Zelesky | 416/95 |
| 7,300,246 | B2 | * | 11/2007 | Durocher et al. | 415/191 |

\* cited by examiner

*Primary Examiner*—Christopher Verdier
(74) *Attorney, Agent, or Firm*—Carlson, Gaskey & Olds PC

(57) ABSTRACT

A pump/flow guide is positioned in a gas turbine engine and attached to a transition duct to face a turbine disk. The pump/flow guide provides a smooth path for guiding purge flow to resist the ingestion of hot gas. One leg of the pump/flow guide extends radially outwardly and contacts the radially inner section of the transition duct that forms a "fish mouth." Spaced tabs on the pump/flow guide receive bolts to secure the pump/flow guide to the transition duct. The pump/flow guide thus provides a relatively smooth flow passage for purge gas flow.

7 Claims, 3 Drawing Sheets

GAS TURBINE ENGINE WITH PURGE AIR PUMP AND GUIDE

BACKGROUND OF THE INVENTION

This application relates to a device that is added into an interface between a gas turbine rotor and a transition duct to assist and guide the flow of purge air outwardly of an inner cavity.

A gas turbine engine, such as a turbo fan engine for an aircraft, includes a fan section, a compression section, a combustion section and a turbine section. An axis of the engine is centrally disposed within the engine and extends longitudinally through the sections. A primary flow path for working medium gases extends axially through the sections of the engine. A secondary flow path for working medium gases extends parallel to and radially outward of the primary flow path.

The fan section includes a rotor assembly and a stator assembly. The rotor assembly of the fan includes a rotor disk and plurality of radially extending fan blades. The fan blades span across through the flow path and interact with the working medium gases and transfer energy between the fan blades and working medium gases. The stator assembly includes a fan case, which circumscribes the rotor assembly in close proximity to the tips of the fan blades.

During operation, the fan draws the working medium gases, more particularly air, into the engine. The fan raises the pressure of the air drawn along the secondary flow path, thus producing useful thrust. The air drawn along the primary flow path into the compressor section is compressed. The compressed air is channeled to the combustion section where fuel is added to the compressed air and the air/fuel mixture is burned. The products of combustion are discharged to the turbine section. The turbine section extracts work from these products to power the fan and compressed air. Any energy from the products of combustion not needed to drive the fan and compressor contributes to useful thrust.

One challenge in the design of gas turbine engines, is that the hot gas in the area of the turbine can begin to move radially inwardly into an inner cavity. This would be undesirable. Ingestion of this hot gas can lead to corrosion of the components, which can lead to shortened part life. At one interface between the turbine rotor and an associated transition housing, purge air flow is directed radially outwardly from the inner cavity to resist this flow of hot gas. However, the present interface presents a tortuous flow path that makes it somewhat difficult to achieve an adequate flow of purge air. Due to this, undesirably large amounts of purge air are necessary. Utilizing large amounts of purge air can lead to lower component efficiencies, and higher thrust specific fuel consumption. This leads to higher fuel consumption for any given flight. Also, additional purge air that is utilized without being captured can result in higher combustion exit temperatures, and a potential reduction in turbine part life. It would be desirable to reduce the amount of purge air needed to resist the flow of hot gas.

SUMMARY OF THE INVENTION

In a disclosed embodiment of this invention, a pump/flow guide is attached to a transition duct at a location facing a turbine rotor. The pump/flow guide moves purge air radially outwardly, such that it has a relatively smooth path. Further, the structure of the pump/flow guide assists in providing a centrifugal pumping structure that drives the purge air radially outwardly.

In the disclosed embodiment, the pump/flow guide has an inner leg, which is bolted to a transition housing, and an outer leg spaced towards the turbine rotor. The outer leg extends radially outwardly and abuts an inner section of a "fish mouth" on the transition housing. In this manner, the air is guided upwardly into the fish mouth, and away from an area radially inwardly of the fish mouth, that was in the tortuous flow path of the prior art.

These and other features of the present invention can be best understood from the following specification and drawings, the following of which is a brief description.

DETAILED DESCRIPTION OF THE PREFERRED EMBODIMENT

Figure 1:
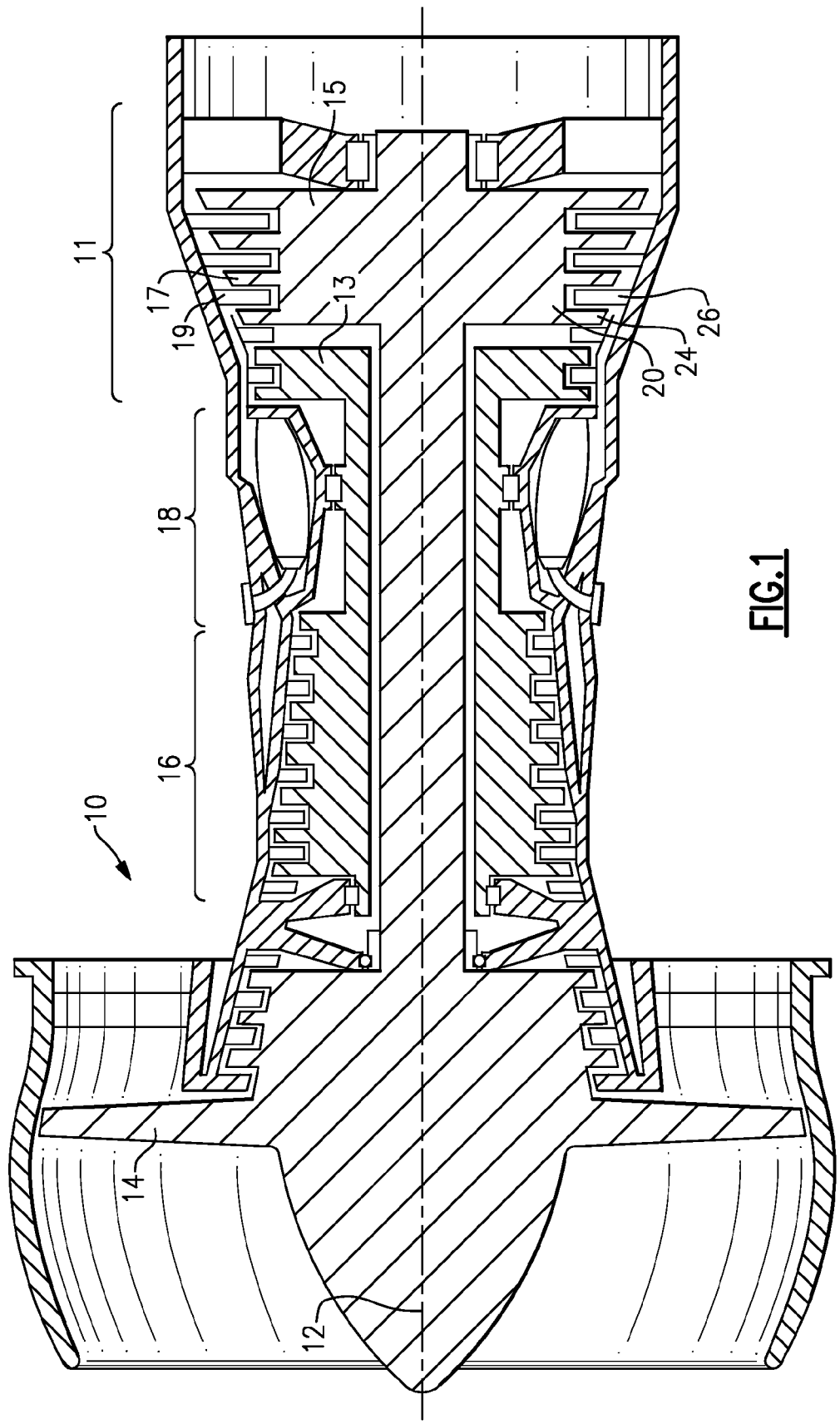
FIG. 1 schematically shows a gas turbine engine.

A gas turbine engine 10, such as a turbofan gas turbine engine, circumferentially disposed about an engine centerline, or axial centerline axis 12 is shown in FIG. 1. The engine 10 includes a fan 14, a compressor section 16, a combustion section 18 and a turbine section 11. As is well known in the art, air compressed in the compressor section 16 is mixed with fuel which is burned in the combustion section 18 and expanded in turbine section 11. The turbine section 11 includes rotors 13 and 15 which rotate in response to the expansion, driving the compressor 16 and fan 14. The turbine section 11 comprises alternating rows of rotary airfoils or blades 17 and static airfoils or vanes 19. This structure is shown somewhat schematically in FIG. 1.

Figure 2:
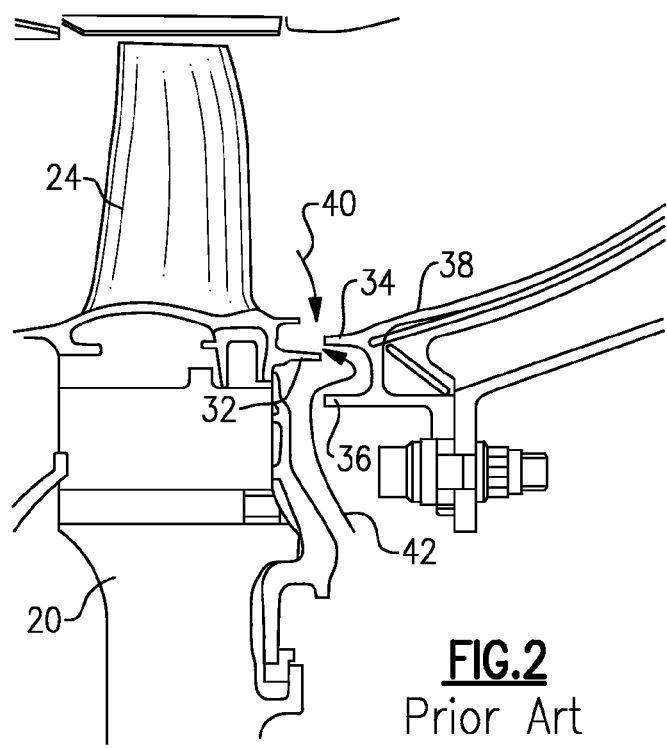
FIG. 2 shows a prior art structure.

A problem associated with the prior art gas turbine engine is illustrated in FIG. 2. As shown, a turbine blade 24 is attached to rotate with a turbine disk or rotor 20. Inner wings 32 extend toward outer section 34 and inner section 36 of a "fish mouth" on a transition duct 38. A space between the transition duct 38 and the inner wings 32 establishes a flow path 40 that allows undesirable migration of hot working medium gases from the flow path radially inwardly. Thus, an effort is made to develop a counter-flow of purge air 42. As can be appreciated from FIG. 2, the flow of purge air 42 encounters a tortuous path including the area directly radially inwardly of the inner section 36. Thus, an unacceptably large amount of purge air flow is required in the prior art to resist the hot gas flow 40.

Figure 3:
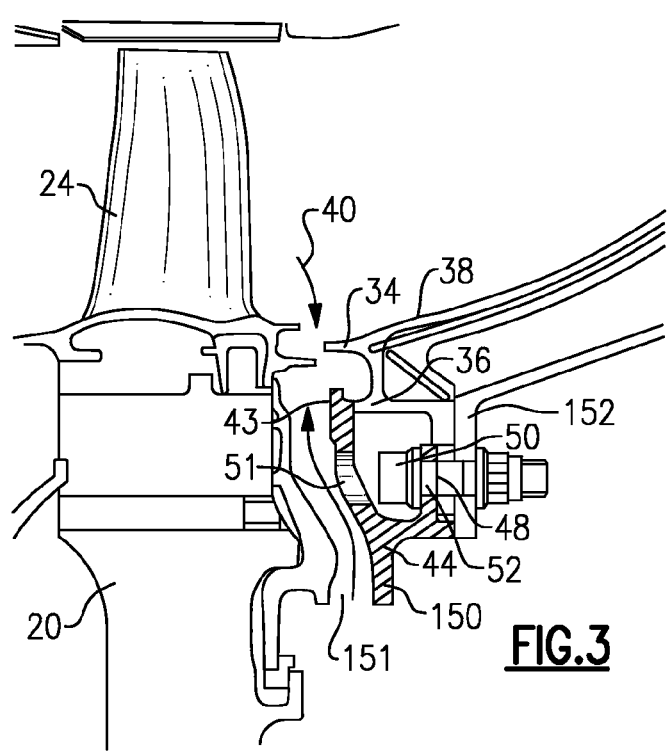
FIG. 3 shows the inventive structure.

The present invention is illustrated in FIG. 3. As shown, a pump/flow guide 44 is attached to the transition duct 38. As shown, a forward leg 43 faces the turbine disk 20. This forward leg 43 extends to a radially outer tip that abuts the inner section 36 of the fish mouth. That is, the forward leg 43 has at least a portion that extends radially outwardly to at least a radial location of said inner section 36 of the fish mouth. A chamfer 54 extends to a surface that includes bolt hole 51.

An aft leg 48 is bolted by bolts 50 to a tab 152 on the transition duct 38. The purge air flow 42 is guided radially outwardly into the area of the fish mouth, such that it can resist the hot gas flow 40.

A radially inner portion 150 of the pump/flow guide 44 provides an entrance 151 into the flow path, and can be seen as a guide flange. As can be seen, this radially inner portion 150 extends radially inwardly of the legs 43 and 48.

Figure 4:
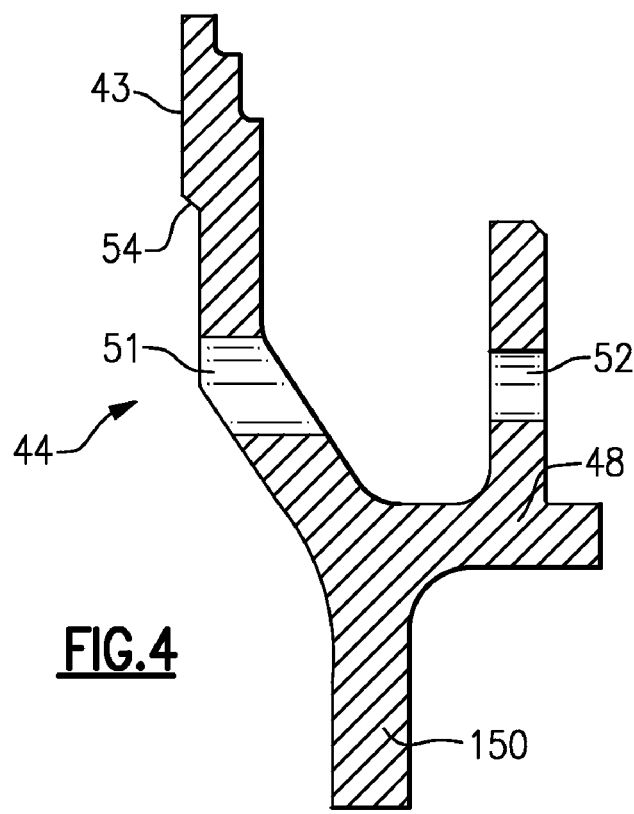
FIG. 4 is a cross-sectional view of the inventive pump/flow guide along line 4-4 of FIG. 5.

As shown in FIG. 4, the pump/flow guide has bolt holes 51 such that the bolts 50 can be moved inwardly, and through bolt holes 52 in the aft leg 48.

Figure 5:
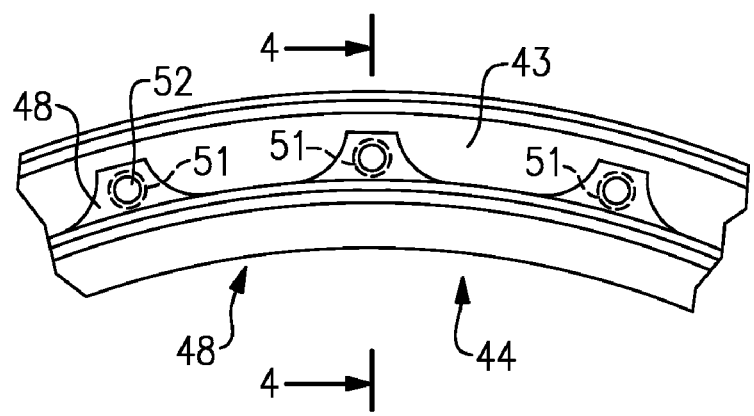
FIG. 5 is an end view of one portion of the inventive pump/flow guide

As can be appreciated from FIG. 5, the aft leg 48 may include plural tabs, which are circumferentially spaced, and need not be a continuous leg.

The present invention thus provides a component that is relatively simple in construction and can be added into the gas turbine engine to provide better purge air flow. The component can be retrofit into existing gas turbine engines, and not only provides a smooth air flow path, but also provides a centrifugal pumping action due to its close proximity to the turbine disk 30 as a result of the rotation of the turbine disk 20. In addition, a radial momentum is imparted to the purge air by this rotation.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine section for a gas turbine engine comprising:
   a turbine disk receiving a plurality of rotor blades, said turbine disk being spaced axially from a fixed housing, and a pump/flow guide attached to said fixed housing to guide purge air radially outwardly through a space between said turbine disk and said fixed housing;
   said fixed housing has a radially inner and radially outer section extending toward said turbine disk, and said radially inner and said radially outer section together forming an intermediate space, with said pump/flow guide having at least a portion extending radially outwardly to at least a radial location of said radially inner section;
   said rotor blades having a wing extending in a direction toward said radially inner section, and said pump/flow guide providing a flow path from radially inward of said radially inner section into said intermediate space;
   said pump/flow guide having a forward leg and an aft leg, said forward leg being said portion;
   said aft leg being provided by a plurality of circumferentially spaced tabs;
   said circumferentially spaced tabs having bolt holes to receive a threaded member to secure the flow guide to the housing structure; and
   passages formed through the forward leg to allow threaded members to be inserted into the bolt holes in the aft leg.

2. The turbine section as set forth in claim 1, wherein said aft leg receiving bolts to secure said pump/flow guide to said fixed housing.

3. The turbine section as set forth in claim 1, wherein a radially inner portion of said pump/flow guide extends radially inwardly beyond said aft and forward legs to provide an entrance to a purge gas flow passage.

4. A flow guide for a gas turbine engine comprising:
   a guide flange for providing an entrance to a guide passage for guiding purge air, when the flow guide is attached to a housing structure in the turbine engine;
   a forward leg extending radially from the guide flange and an aft leg spaced from the forward leg and also extending radially from the guide flange, the aft leg being utilized to attach the flow guide to said housing structure and the gas turbine engine, and the forward leg together with the guide flange defining a flow path;
   the aft leg being provided by a plurality of circumferentially spaced tabs;
   the circumferentially spaced tabs having bolt holes to receive a threaded member to secure the flow guide to the housing structure; and
   passages being formed through the forward leg to allow threaded members to be inserted into the bolt holes in the aft leg.

5. The flow guide as set forth in claim 4, wherein the forward leg extends radially from the guide flange for a greater distance than the aft leg.

6. The turbine section as set forth in claim 1, wherein said pump/flow guide provides a path from a radially inner location in a direction such that air moving from an inner portion of said pump/flow guide toward a radially outer portion extends in a direction toward said turbine disk, the path not extending away from the turbine disk until reaching the wing.

7. The turbine section as set forth in claim 1, wherein the forward leg extending radially for a greater distance than the aft leg.

* * * * *

UNITED STATES PATENT AND TRADEMARK OFFICE
CERTIFICATE OF CORRECTION

PATENT NO.         : 7,581,923 B2                                        Page 1 of 1
APPLICATION NO.    : 11/159686
DATED              : September 1, 2009
INVENTOR(S)        : Moore et al.

It is certified that error appears in the above-identified patent and that said Letters Patent is hereby corrected as shown below:

Claim 1, Column 4, line 1: "circuniferentially" should read as --circumferentially--

Claim 4, Column 4, line 16: insert --gas-- before "turbine"

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,581,923 B2  Page 1 of 1
APPLICATION NO. : 11/159686
DATED : September 1, 2009
INVENTOR(S) : Moore et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Fourteenth Day of September, 2010

David J. Kappos
*Director of the United States Patent and Trademark Office*